(12) United States Patent
Kuczynski, Jr. et al.

(10) Patent No.: US 8,821,772 B2
(45) Date of Patent: Sep. 2, 2014

(54) FLUORESCENT COMPOUNDS FOR DETECTING USE OF PROPER PLASTIC MOLDING TEMPERATURES

(75) Inventors: Joseph Kuczynski, Jr., Rochester, MN (US); Melissa K. Miller, Morrisville, NC (US); Heidi D. Williams, Cary, NC (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 13/526,950

(22) Filed: Jun. 19, 2012

(65) Prior Publication Data

US 2013/0333199 A1 Dec. 19, 2013

(51) Int. Cl.
*B29C 45/76* (2006.01)
*C09K 11/00* (2006.01)

(52) U.S. Cl.
USPC .............. 264/21; 264/328.17; 264/328.18; 264/40.1; 264/51; 264/53; 264/54; 264/331.14; 252/408.1; 252/960; 252/962; 252/301.16; 252/301.35; 427/157

(58) Field of Classification Search
USPC ........... 264/328.17, 328.18, 40.1, 51, 52, 53, 264/54, 55, 331.14, 21; 521/79, 80, 81; 252/960, 962, 408.1, 301.16, 301.24, 252/301.25, 301.27, 301.28, 301.34, 252/301.35; 427/157
See application file for complete search history.

(56) References Cited

U.S. PATENT DOCUMENTS

| | | | |
|---|---|---|---|
| 2,132,969 A | 10/1938 | Rau | |
| 2,634,243 A | 4/1953 | Glenn | |
| 3,065,189 A | 11/1962 | Becke et al. | |
| 3,150,214 A * | 9/1964 | Scalora et al. | 264/53 |
| 3,781,183 A * | 12/1973 | Doll | 428/136 |
| 4,133,858 A * | 1/1979 | Hayakawa et al. | 264/54 |
| 4,280,005 A * | 7/1981 | Fox | 521/90 |
| 5,490,475 A | 2/1996 | Bryant et al. | |
| 5,597,517 A | 1/1997 | Chopdekar et al. | |
| 5,705,103 A | 1/1998 | Chopdekar et al. | |
| 6,060,169 A * | 5/2000 | Kuczynski et al. | 428/457 |
| 6,233,481 B1 | 5/2001 | Lawandy | |

(Continued)

FOREIGN PATENT DOCUMENTS

JP 2007183139 7/2007
WO WO9741187 A1 11/1997

*Primary Examiner* — Timothy Kennedy
(74) *Attorney, Agent, or Firm* — Katherine S. Brown; Jeffrey L. Streets

(57) ABSTRACT

A method comprising injection molding a plastic part from a polymer formulation comprising an injection moldable thermoplastic and a fluorescent compound, wherein the fluorescent compound has a decomposition temperature that establishes a maximum processing temperature for the polymer formulation. The fluorescent compound will thermally decompose to generate gaseous products causing visible bubble formation in the surface of the plastic part in response to exposure to a processing temperature that exceeds the decomposition temperature of the fluorescent compound. If the plastic part was processed without exposure to a processing temperature that exceeds the decomposition temperature of the fluorescent compound, then any fluorescent compound within the plastic part will cause the plastic part to fluoresce in response to exposure to black light. A suitable fluorescent compound may be, for example, selected from oxalates, carbamic acids, carbonic acids, diazocarbonyl compounds, and combinations thereof. A preferred fluorescent compound is bis(2,4,6-trichlorophenyl)oxalate.

21 Claims, 1 Drawing Sheet

(56) References Cited

U.S. PATENT DOCUMENTS

| | | |
|---|---|---|
| 6,607,918 B2 | 8/2003 | LaGraff et al. |
| 6,929,764 B2 | 8/2005 | Jiang et al. |
| 7,416,689 B2 | 8/2008 | Yamate |
| 7,480,542 B2 | 1/2009 | Kroeger et al. |
| 7,585,166 B2 | 9/2009 | Buja |
| 2002/0143073 A1 | 10/2002 | Jiang et al. |
| 2002/0153088 A1* | 10/2002 | Chen et al. ............... 156/244.11 |
| 2006/0131771 A1* | 6/2006 | McBain et al. .............. 264/40.1 |

* cited by examiner

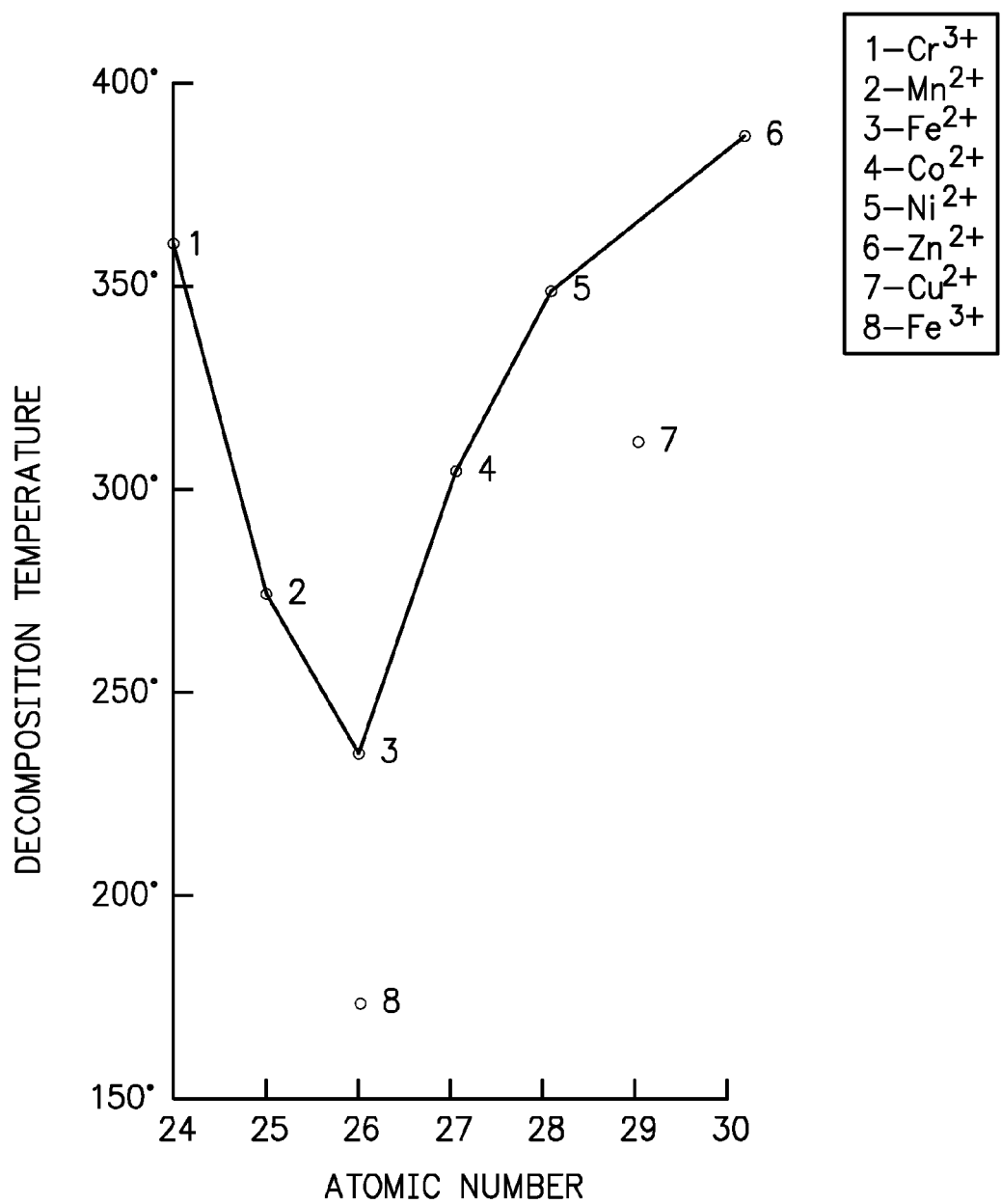

US 8,821,772 B2

FLUORESCENT COMPOUNDS FOR DETECTING USE OF PROPER PLASTIC MOLDING TEMPERATURES

BACKGROUND

1. Field of the Invention

The present invention relates to the formation of plastic parts, and more particularly to detecting the use of an improper processing temperature.

2. Background of the Related Art

Computer systems are complex combinations of parts working together to accomplish a design objective. Aside from the actual computers, servers, switches, network hardware and the like, the infrastructure used to arrange and manage the computer hardware can also be complex and may involve numerous parts that are especially made for a particular purpose.

Plastic parts are beneficial for use in the infrastructure of a computer system because they can be inexpensive to make, are typically electronically non-conductive, and may be strong without being heavy. Accordingly, many structural components in a computer system will be made from plastic. Furthermore, these same advantages that make plastics a useful material in computer systems also make plastics useful in non-limiting applications, ranging from household items to automotive parts.

However, plastic parts must be processed properly in order to avoid degradation and obtain their intended physical properties, such as strength. For example, it is important to form the plastic part at the manufacturer's recommended temperature in order to avoid compromising the flexural strength, fatigue resistance, or other physical properties of the plastic. Even normal use of such parts may result in broken parts. It is unfortunate that plastic parts may be processed under conditions that are outside of the resin manufacturer's recommended process conditions in order to produce more parts in the shortest period of time. Once these plastic parts have been made, detection of improper processing requires time consuming and destructive analytical techniques that are not routinely performed at the time of processing.

Unfortunately, the compromised physical properties of a molded plastic part that has been made outside of the proper processing conditions may not become evident until long after the part has been in service and suffers a failure during use. At that point, the failed part must be replaced at the expense of the additional part, inconvenience, and potential downtime of related devices. For example, if a plastic latch used to secure a hard disk drive into a chassis bay was formed under improper conditions, the latch may break during use. As a result of the broken latch, a new latch or new carriage for the hard drive may be required. Until the broken part is satisfactorily replaced, the hard drive itself may remain out-of-service.

BRIEF SUMMARY

One embodiment of the present invention provides a method comprising injection molding a plastic part from a polymer formulation comprising an injection moldable thermoplastic and a fluorescent compound, wherein the fluorescent compound has a decomposition temperature that establishes a maximum processing temperature for the polymer formulation. The fluorescent compound will thermally decompose to generate gaseous products causing visible bubble formation in the surface of the plastic part in response to exposure to a processing temperature that exceeds the decomposition temperature of the fluorescent compound. However, if the plastic part was processed without exposure to a processing temperature that exceeds the decomposition temperature of the fluorescent compound, then any fluorescent compound within the plastic part will cause the plastic part to fluoresce in response to exposure to black light.

Another embodiment of the present invention provides a method comprising injection molding a plastic part from a polymer formulation comprising an injection moldable thermoplastic, a fluorophore, and a thermally degradable compound, wherein the thermally degradable compound has a decomposition temperature that establishes a maximum processing temperature for the polymer formulation, wherein the thermally degradable compound will thermally decompose to generate gaseous products causing visible bubble formation in the surface of the plastic part in response to being exposed to a processing temperature that exceeds the decomposition temperature of the fluorescent compound, and wherein the fluorophore within the plastic part will cause the plastic part to fluoresce in response to being exposed to black light.

BRIEF DESCRIPTION OF THE SEVERAL VIEWS OF THE DRAWINGS

FIG. 1 is a graph showing the decomposition temperature for each of a number of different metal oxalates.

DETAILED DESCRIPTION

One embodiment of the present invention provides a method for determining whether an injection moldable thermoplastic has been processed at a proper temperature. The method comprises injection molding a plastic part from a polymer formulation comprising an injection moldable thermoplastic and a fluorescent compound, wherein the fluorescent compound has a decomposition temperature that establishes a maximum processing temperature for the polymer formulation. The fluorescent compound will thermally decompose to generate gaseous products causing visible bubble formation in the surface of the plastic part in response to exposure to a processing temperature that exceeds the decomposition temperature of the fluorescent compound. However, if the plastic part was processed without exposure to a processing temperature that exceeds the decomposition temperature of the fluorescent compound, then any fluorescent compound within the plastic part will cause the plastic part to fluoresce in response to exposure to black light. Because the plastic part has been formed from a polymer formulation comprising the fluorescent compound, the plastic part will fluoresce when exposed to black light. Therefore, it is possible to visually verify that the fluorescent compound was in fact present in the resin formulation during processing of the plastic part.

Non-limiting examples of the injection moldable thermoplastics include polycarbonate (PC), acrylonitrile butadiene styrene (ABS), polyethylene terephthalate (PET), polybutylene terephthalate (PBT), liquid crystal polymers (LCP), polyamide (PA), polyphenylene oxide (PPO), any other injection moldable thermoplastic, or blends of thermoplastics.

The fluorescent compounds are selected to decompose in a manner that gives off one or more gasses at a temperature (i.e., a decomposition temperature) that corresponds to a given resin processing temperature. For example, fluorescent-labeled oxalates decompose to evolve water vapor ($H_2O$), carbon monoxide (CO) and/or carbon dioxide ($CO_2$)). Though the invention is not limited by the decomposition reactions of the fluorescent compounds, the following are believed to represent at least one of the decomposition reactions that these compounds may follow:

For a metal oxalate, either:

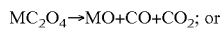

$MC_2O_4 \rightarrow MO + CO + CO_2$; or

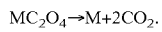

$MC_2O_4 \rightarrow M + 2CO_2$.

For carbamic acids:

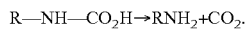

$R-NH-CO_2H \rightarrow RNH_2 + CO_2$.

For carbonic acids:

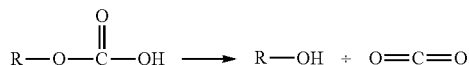

For diazocarbonyls:

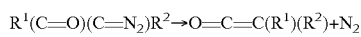

$R^1(C=O)(C=N_2)R^2 \rightarrow O=C=C(R^1)(R^2) + N_2$

Oxalate $(C_2O_4)^{2-}$, also written $(COO)_2^{2-}$, is a dianion that combines with many metal cations to form insoluble precipitates. Non-limiting example of oxalates and their decomposition temperatures are given in FIG. 1.

The fluorescent compound may, for example, be selected from fluorescent-labeled oxalates, fluorescent-labeled carbamic acids, fluorescent-labeled carbonic acids, and fluorescent-labeled diazocarbonyl compounds. A preferred fluorescent-labeled additive is a fluorescent-labeled oxalate, such as bis(2,4,6-trichlorophenyl)oxalate (BTPO). The structure of BTPO is shown as follows:

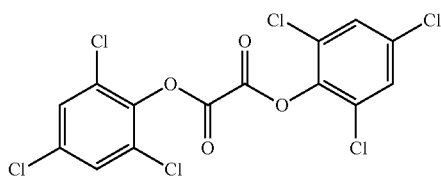 [SMILES: O=C(Oc1c(Cl)cc(Cl)cc1Cl)C(=O)Oc1c(Cl)cc(Cl)cc1Cl]

Thermogravimetric analysis (TGA) of BTPO clearly indicate a mass loss onset at roughly 230° C. with a maximum rate of decomposition occurring at 316° C. The exact composition of the evolved gas is presently unknown. However, bubbles or voids will form in the molded part with any gas phase compound. The thermoplastic resin would be compounded with the BTPO (or other suitable material) prior to molding. Incorporation of the fluorescent compound, such as BTPO, can be verified by visual inspection of the molded part under black light illumination. The methods of the present invention may include discarding the plastic part in response to detecting that the plastic part does not fluoresce in response to being exposed to black light. If the parts are molded at temperatures exceeding the maximum recommended parameters, the BTPO thermally decomposes evolving gaseous products that will result in bubble or void formation in the molded part rendering the part useless. The methods of the present invention may include discarding the plastic part in response to detecting surface irregularities in the plastic part.

Non-limiting examples of a fluorescent-labeled oxalate include bis(2,4,6-trichlorophenyl)oxalate; bis(2,4,5-trichlorophenyl-6-carbopentoxyphenyl)oxalate; bis(2,4-dinitrophenyl)oxalate; diphenyl oxalate; bis(2-carbopentyloxy-3,5,6-trichlorophenyl)oxalate, and combinations thereof.

Yet another type of fluorescent-labeled oxalate may be prepared in the form of a metal dioxalate, where the oxalates are fluorescent-labeled. For example, the reaction set out below reacts only one equivalent of trichlorophenol (TCP) with oxalic acid to form the half ester. The half ester is then reacted with the appropriate divalent metal chloride to form a fluorescent-labeled metal dioxalate, which precipitates from an aqueous solution. Non-limiting examples of the divalent metals may include manganese, iron, cobalt, nickel, zinc, and copper.

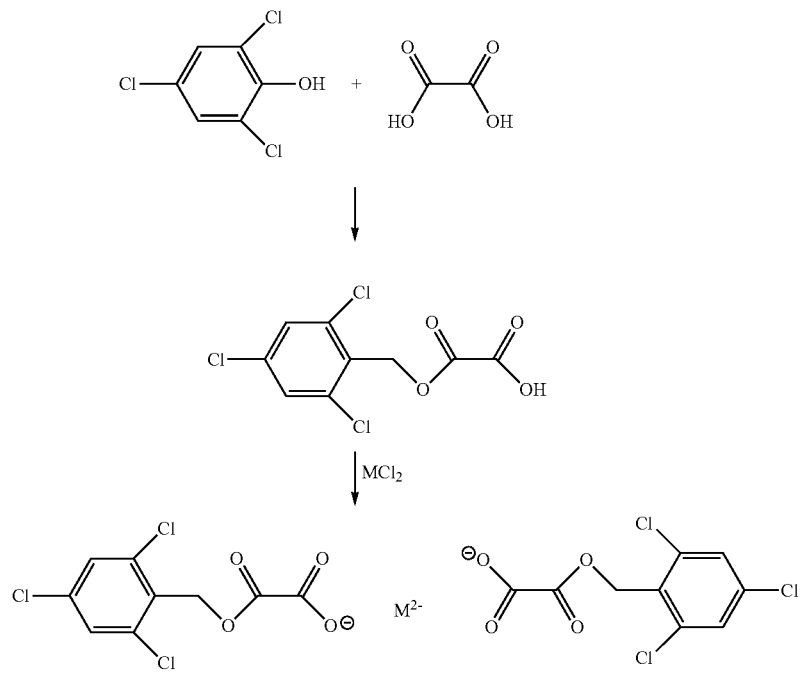

In another embodiment, the resin may be formulated with both a non-fluorescent metal oxalate (or other thermally degradable compound) and a separate fluorophore, wherein the selected non-fluorescent metal oxalate (or other thermally degradable compound) has a decomposition temperature that establishes a maximum processing temperature for the polymer formulation and the fluorophore has a decomposition temperature that is greater than or equal to the decomposition temperature of the non-fluorescent metal oxalate (or other thermally degradable compound). Non-limiting examples of non-fluorescent metal oxalates and their decomposition temperatures are disclosed in reference to FIG. 1, discussed below. Non-limiting examples of suitable fluorophores include fluorescein, fluorescein isothiocyanate, and other derivatives. The decomposition products of fluorescein isothiocyanate include carbon oxides (CO, $CO_2$), nitrogen oxides (NO, $NO_2$ . . . ), hydrogen cyanide, and sulfur dioxide.

FIG. 1 is a graph showing the decomposition temperature for each of a number of different metal oxalates. The temperature at which a given oxalate compound will thermally decompose is a well-known value. However, the temperature at which any compound will thermally decompose and evolve gaseous products may be determined through simple thermogravimetric (TGA) analysis. The exact temperature at which bubble formation occurs may vary slightly depending, in part, on the thermoplastic (i.e., the melt viscosity) and the molding parameters (because melt viscosity generally follows a power law dependence with temperature, i.e., the higher the melt temperature, the lower the viscosity).

The thermally degradable compound generates gaseous products when it decomposes. Those gaseous products may include water ($H_2O$), carbon monoxide (CO), carbon dioxide ($CO_2$), nitrogen gas ($N_2$), and combinations thereof. For example, the oxalates decompose to release CO and/or $CO_2$, carbamic acids decompose to release carbon dioxide ($CO_2$), carbonic acids decompose to release carbon dioxide ($CO_2$), and diazocarbonyl compounds liberate nitrogen gas ($N_2$). If the polymer formulation is exposed to temperatures greater than the maximum processing temperature, then the additive decomposes and one or more of the gaseous products are evolved. The gas evolution causes bubbles, voids or other forms of surface irregularities to form in the plastic part. Bubbles or voids forming on the surface of the plastic part are clearly visible to the unaided eye. Accordingly, improper processing of a plastic containing the thermally degradable compound will render the molded plastic part useless. The polymer formulation preferably includes only a small fraction of the thermally degradable compound, such as less than one percent of the polymer formulation.

In accordance with the present invention, the decomposition temperature of the thermally degradable compound establishes a maximum processing temperature for the polymer formulation. Therefore, it is preferable to select a compound having a decomposition temperature that correlates with a manufacturer's recommended processing temperature for the thermoplastic. For any given thermoplastic, the recommended processing temperature is well documented.

In one example, the recommended processing temperature range for a polycarbonate/acrylonitrile butadiene styrene (PC/ABS) blend is between 230° C. and 280° C. In this example, the maximum processing temperature is 280° C. By selecting an appropriate oxalate for blending with the PC/ABS, a proper processing temperature can be ensured. For example, BTPO has a decomposition temperature that is just greater than 230° C., but decomposition does not occur in earnest until roughly 250° C. Accordingly, adding BTPO into the PC/ABS prior to processing will ensure that the PC/ABS is processed without exceeding 250° C., which is in the middle of the recommended processing temperature range of from 230° C. to 280° C. Using BTPO in the PC/ABS ensures that the resin is molded well within the specified parameters (i.e., below 280° C.), since a processing temperature exceeding 250° C. will result in an unusable part. Conversely, a processing temperature between 230° C. (the minimum recommended processing temperature) and 250° C. (the effective decomposition temperature of BTPO during the short residence time spent in an injection molding machine) will result in a usable part that fluoresces to confirm that the BTPO was included in the resin formulation.

Since only small quantities of the thermally degradable compound, such as an oxalate, are required to generate sufficient gas to visibly detect improper molding conditions, the addition of the thermally degradable compound into the resin does not alter the bulk physical properties of the resin. The thermally degradable compound should be inert to reactions with the thermoplastic under the conditions expected to be experienced in processing the injection moldable thermoplastic. So long as the actual processing temperature is less than the decomposition temperature of the compound, the compound should have essentially no negative effect on the physical properties of the plastic part.

As a general matter, a suitable thermally degradable compound might be one that thermally decomposes and generates gaseous products (such as $H_2O$, CO, $CO_2$, $N_2$, etc.) at a temperature that is up to 20° C. greater than the maximum recommended processing temperature. Preferably, the thermally degradable compound will have a decomposition temperature that is no more than 5° C. greater than the maximum recommended processing temperature. The exact thermally degradable compound selected for a given thermoplastic may be determined on an empirical basis in order to provide an acceptable margin between the decomposition temperature of the thermally degradable compound and the maximum processing temperature of the thermoplastic.

If the decomposition temperature of the selected thermally degradable compound is greater than the maximum processing temperature of the thermoplastic, for example by 5° C., and the thermoplastic is processed at a temperature up to the maximum recommended processing temperature, then the thermally degradable compound will not decompose and will not cause surface irregularities in the molded plastic part. However, if the thermoplastic is processed at a temperature exceeding the maximum recommended processing condition by more than 5° C., then the thermally degradable compound will thermally decompose, generate gaseous products, and cause visibly detectable surface irregularities, such as bubbles and voids.

A thermally degradable compound may also have a decomposition temperature that is less than the maximum processing temperature. However, a thermally degradable compound that decomposes at temperatures much lower (i.e., more than 20° C. lower) than the maximum recommended processing condition for a given thermoplastic may not be a good selection for mixing with the given thermoplastic, since surface irregularities might still occur despite processing under the recommended maximum processing temperature.

A thermally degradable compound, such as one of the non-limiting examples of oxalates identified in FIG. 1, is compounded with the thermoplastic resin in a concentration that is sufficient to result in a visible cosmetic defect if the thermoplastic is processed at a temperature exceeding the recommended processing temperature. An effective concentration of a thermally degradable compound for a given thermoplastic may be easily determined by formulating and processing several batches of a given thermoplastic with varying concentrations of the thermally degradable compound and various temperatures above and below the maximum processing temperature for the thermoplastic, and/or above and below the decomposition temperature for the thermally degradable compound. If the processing temperature exceeds the decomposition temperature, but there are no obvious visual defects in the surface of the plastic part, then the concentration should be increased. However, if a given concentration produces visual defects that are easily detectable, then there is no reason to further increase the concentration of the thermally degradable compound. For example, the oxalate may, without limitation, be added to the thermoplastic in the range of 1 to 5 weight percent (wt %). Similarly, if the thermally degradable compound decomposes too early (at an appropriate processing temperature for the thermoplastic), then a thermally degradable compound with a higher decomposition temperature might be selected. If the thermally degradable compound decomposes too late (at a temperature exceeding the maximum processing temperature for the thermoplastic), then a thermally degradable compound with a lower decomposition temperature might be selected.

If the thermoplastic resin was processed outside the recommended processing conditions in the absence of the oxalate, the improper processing conditions are unlikely to result in a visible defect in the molded plastic part. However, the improper processing conditions can result in compromised physical properties of the plastic part. These types of defects often go undetected until after the plastic part has been put into use. Using a suitable concentration of a thermally degradable compound causes an immediately visible indication that the thermoplastic was processed under improper conditions and that the resulting plastic part should not be used.

In one embodiment of the present invention, the method further comprises detecting whether the molded plastic part has surface irregularities indicating that the processing conditions for the thermoplastic were improper. More specifically, the detection of surface irregularities in the molded plastic part indicates that the plastic part was formed at a temperature exceeding the recommending processing temperature and that the physical properties of the thermoplastic may be compromised. Optionally, the method may then further include discarding the molded plastic part in response to detecting surface irregularities in the plastic part. Conversely, the method may further include installing the molded plastic part in a finished product in response to detecting no surface irregularities in the plastic part.

Detecting whether the molded plastic part has surface irregularities may include visually inspecting the molded plastic part. The ability to visually detect the surface irregularities and attribute those irregularities to improper processing conditions is very beneficial. For one thing, the manufacturer of the plastic part is unable to hide the surface defects and is thereby prevented from processing plastic parts outside the recommended processing conditions. The term "visual" is intended to encompass both human sight and the use of optical detection techniques, such as microscopes and image analysis software.

A plastics manufacturer will typically characterize the resin formulation using a battery of analytical test. For example, rheology may be utilized to determine the melt temperature (Tm), and viscosity and thermogravimetric analysis may be used to determine the decomposition temperature (Td). The processing temperature (Tp) is selected such that Tm<Tp<Td. Once the thermoplastic resin has been characterized using these analytical techniques, mold flow analysis (via commercially available software) is generally conducted to establish an initial set of injection molding parameters. An actual mold trial is finally conducted to refine the processing conditions.

In a preferred embodiment, the method includes both detecting whether the plastic part fluoresces in response to being exposed to black light, and detecting whether the plastic part has surface irregularities indicating that the actual processing temperature exceeded a target processing temperature for the thermoplastic. The method then further includes installing the molded plastic part in a finished product in response to detecting no surface irregularities in the plastic part and detecting that the plastic part fluoresces in response to being exposed to black light. Similarly, the method may further include discarding the molded plastic part in response to either detecting surface irregularities in the plastic part (indicating the processing exceeded the decomposition temperature of the thermally degradable compound) or detecting that the plastic part does not fluoresce in response to being exposed to black light (indicating that the plastic part was formed from resin that did not include a fluorescent compound).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   injection molding a plastic part from a polymer formulation comprising an injection moldable thermoplastic and a fluorescent compound, wherein the fluorescent compound has a decomposition temperature that establishes a maximum processing temperature for the polymer formulation, wherein the fluorescent compound will thermally decompose to generate gaseous products causing visible bubble formation in the surface of the plastic part in response to being exposed to a processing temperature that exceeds the decomposition temperature of the fluorescent compound, and wherein the fluorescent compound that does not decompose within the plastic part will cause the plastic part to fluoresce in response to being exposed to black light.

2. The method of claim 1, wherein the fluorescent compound is a fluorescent-labeled oxalate.

3. The method of claim 2, wherein the fluorescent-labeled oxalate is bis(2,4,6-trichlorophenyl) oxalate.

4. The method of claim 2, wherein the fluorescent-labeled oxalate is selected from bis(2,4,6-trichlorophenyl)oxalate; bis(2,4,5-trichlorophenyl-6-carbopentoxyphenyl) oxalate; bis(2,4-dinitrophenyl) oxalate; diphenyl oxalate; and bis(2-carbopentyloxy-3,5,6-trichlorophenyl) oxalate, and combinations thereof.

5. The method of claim 1, wherein the decomposition temperature of the fluorescent compound is greater than or equal to a maximum processing temperature for the thermoplastic.

6. The method of claim 1, wherein the decomposition temperature of the fluorescent compound is less than a maximum processing temperature for the thermoplastic by no more than 20° C.

7. The method of claim 1, further comprising:
detecting whether the plastic part fluoresces in response to being exposed to black light.

8. The method of claim 7, further comprising:
discarding the plastic part in response to detecting that the plastic part does not fluoresce in response to being exposed to black light.

9. The method of claim 1, further comprising:
detecting whether the plastic part has surface irregularities indicating that the processing temperature exceeded a target processing temperature for the thermoplastic.

10. The method of claim 9, further comprising:
discarding the plastic part in response to detecting surface irregularities in the plastic part.

11. The method of claim 1, further comprising:
detecting whether the plastic part fluoresces in response to being exposed to black light;
detecting whether the plastic part has surface irregularities indicating that the actual processing temperature exceeded a target processing temperature for the thermoplastic; and
installing the molded plastic part in a finished product in response to detecting no surface irregularities in the plastic part and detecting that the plastic part fluoresces in response to being exposed to black light.

12. The method of claim 9, wherein the step of detecting whether the plastic part has surface irregularities includes visually inspecting the molded plastic part.

13. The method of claim 12, wherein the surface irregularities are selected from bubbles and voids.

14. The method of claim 9, further comprising:
visually inspecting the plastic part for the presence of bubbles in the surface of the plastic part, wherein the presence of bubbles indicates that the processing temperature exceeded the decomposition temperature of the additive.

15. The method of claim 1, wherein the fluorescent compound comprises less than five percent of the polymer formulation.

16. The method of claim 1, wherein the fluorescent compound is inert to reactions with the thermoplastic.

17. The method of claim 1, wherein the fluorescent compound has essentially no negative effect on the physical properties of the plastic part when the processing temperature is less than the decomposition temperature of the fluorescent compound.

18. The method of claim 1, wherein the gaseous products are selected from water vapor, carbon monoxide, carbon dioxide, nitrogen and combinations thereof.

19. The method of claim 1, wherein the fluorescent compound is selected from oxalates, carbamic acids, carbonic acids, diazocarbonyl compounds, and combinations thereof.

20. The method of claim 1, wherein the injection moldable thermoplastic is selected from polycarbonate (PC), acrylonitrile butadiene styrene (ABS), polyethylene terephthalate (PET), polybutylene terephthalate (PBT), liquid crystal polymers (LCP), polyamide (PA), and polyphenylene oxide (PPO).

21. The method of claim 1, wherein the injection moldable thermoplastic is a blend of polycarbonate and acrylonitrile butadiene styrene.

* * * * *